(12) United States Patent
Kim et al.

(10) Patent No.: US 11,983,043 B2
(45) Date of Patent: May 14, 2024

(54) FLEXIBLE DISPLAY DEVICE

(71) Applicant: LG ELECTRONICS INC., Seoul (KR)

(72) Inventors: Jaewook Kim, Seoul (KR); Insu Song, Seoul (KR); Hoseok Chung, Seoul (KR); Minsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/928,838

(22) PCT Filed: Jun. 1, 2020

(86) PCT No.: PCT/KR2020/007069
§ 371 (c)(1),
(2) Date: Nov. 30, 2022

(87) PCT Pub. No.: WO2021/246535
PCT Pub. Date: Dec. 9, 2021

(65) Prior Publication Data
US 2023/0176622 A1    Jun. 8, 2023

(51) Int. Cl.
*G06F 1/16* (2006.01)
(52) U.S. Cl.
CPC .......... *G06F 1/1652* (2013.01); *G06F 1/1624* (2013.01); *G06F 1/1675* (2013.01)
(58) Field of Classification Search
CPC ..... G06F 1/1652; G06F 1/1624; G06F 1/1675
See application file for complete search history.

(56) References Cited

U.S. PATENT DOCUMENTS

| | | | |
|---|---|---|---|
| 2017/0115701 A1* | 4/2017 | Bae | G06F 1/16 |
| 2017/0177403 A1* | 6/2017 | Choi | G06F 9/461 |
| 2017/0179661 A1* | 6/2017 | Szeto | H04M 1/72409 |
| 2017/0181304 A1* | 6/2017 | Lee | H05K 7/005 |
| 2018/0181164 A1 | 6/2018 | Chen | |
| 2020/0409421 A1* | 12/2020 | Cho | G06F 1/1681 |
| 2020/0409431 A1* | 12/2020 | Fan | H04M 1/0268 |
| 2020/0411779 A1* | 12/2020 | Tanaka | H10K 77/111 |

FOREIGN PATENT DOCUMENTS

| | | |
|---|---|---|
| KR | 10-2014-0059274 A | 5/2014 |
| KR | 10-2014-0147497 A | 12/2014 |
| KR | 10-2016-0087460 A | 7/2016 |
| WO | WO2017/057859 A1 | 4/2017 |

* cited by examiner

*Primary Examiner* — Sejoon Ahn
(74) *Attorney, Agent, or Firm* — Birch, Stewart, Kolasch & Birch, LLP

(57) ABSTRACT

The present invention relates to a flexible display device comprising: a first body, a second body configured to be movable relative to the first body, a flexible display part disposed to be exposed to the front side of the first body and the back side of the second body, and a link module that guides the first body and second body to move relative to each other, wherein the link module fixes the first body and the second body to each other to prevent the first body and the second body from moving closer to or away from each other when the first body and the second body have been positioned to be spaced a pre-configured distance apart from each other.

13 Claims, 11 Drawing Sheets

(a)

(b)

(a)

(b)

(a)    (b)

(a)

(b)

(a)

(b)

FLEXIBLE DISPLAY DEVICE

CROSS-REFERENCE TO RELATED APPLICATIONS

This application is the National Phase of PCT International Application No. PCT/KR2020/007069, filed on Jun. 1, 2020, all of which is hereby expressly incorporated by reference into the present application.

TECHNICAL FIELD

The present disclosure relates to a flexible display device having a flexible display that is deformable by an external force.

BACKGROUND ART

A portable electronic device (hereinafter, a mobile terminal) such as a communication terminal, a multimedia device, a portable computer, a game player, and a photographing device is provided with a display to display image information. The mobile terminal may have a folding structure that can be folded to a smaller size for convenience of carrying. In this type of electronic device, two bodies are connected by a folding structure (for example, a hinge portion).

Displays in the related art have a non-foldable structure, and thus a structure in which a display is disposed over two whole bodies that are foldably connected to each other cannot be implemented. Therefore, a substantially large screen cannot be applied to an electronic device with a folding structure.

However, as a flexible display capable of bending has been developed recently, researches to apply a flexible display to a mobile terminal are being conducted, and thus, it is possible to implement a large screen on a device.

Such a flexible display device may implement various sizes of screen by using deformable characteristics of the flexible display. For example, a flexible display device that can be extended to a screen size desired by a user by allowing the flexible display to be drawn out of the device body to extend an area exposed outside may be considered.

However, in the case of such a flexible display device, in order to take advantage of the deformable characteristics of the flexible display, many components must be provided therein, and thus the structure is highly likely to be complicated. Furthermore, in this case, since many components must be provided in the internal space, there is a restriction on the use of the space, so it may be difficult to secure sufficient battery installation space, and as the flexible display is deformed, an unnecessary load may be applied to the flexible display, thereby reducing durability of the device.

In addition, in a flexible display that extends as two bodies move away from each other, or contracts as two bodies move closer to each other in one direction, the two bodies spaced from each other may be rotated in directions misaligned from each other to reduce durability or damage the flexible display device.

Moreover, the two bodies separated from each other may cause inconvenience in using the flexible display device due to unintentionally moving closer or further away from each other. Besides, there is a risk of damage to internal components by a large external force while the two bodies are separated from each other.

DISCLOSURE OF INVENTION

Technical Problem

A first aspect of the present disclosure is to provide a flexible display device having a new rolling-type mechanism for implementing various screens of a flexible display.

A second aspect of the present disclosure is to provide a structure of a flexible display device capable of implementing a smooth movement of the flexible display and preventing or reducing two bodies from being relatively rotated in directions misaligned from each other.

A third aspect of the present disclosure is to provide a structure of a flexible display device capable of preventing or reducing two bodies separated from each other from unintentionally moving closer to or away from each other, and protecting internal components even from an external force.

Solution to Problem

In order to achieve the objectives of the present disclosure, a flexible display device as described above may include a first body, a second body configured to be movable relative to the first body, a flexible display disposed to be exposed to a front surface of the first body and a rear surface of the second body, and a link module that guides the first body and the second body to move relative to each other, wherein the link module fixes the first body and the second body to each other to prevent or reduce the first body and the second body from moving closer to or away from each other when the first body and the second body are spaced apart by a preset distance.

For another example, the first body and the second body may be configured to implement a first state in which an area of the flexible display exposed through a rear surface portion of the second body is the largest when the first body and the second body are positioned adjacent to each other, a second state in which an area of the flexible display exposed through a front surface portion of the first body is the largest when the first body and the second body are positioned away from each other, and a stroke state in which the first state and the second state are switched from each other, respectively, and the link module may fix the first body and the second body to each other to prevent or reduce the first body and the second body from being switched to the stroke state from the second state.

For another example, the first body and the second body may be configured to implement a released state in which the first body and the second body are disposed further apart than the second state, and the link module may be configured to switch the first body and the second body back to the stroke state from the released state.

For another example, the link module may include a path portion disposed to be open on part of the first body, and a link portion disposed on the second body to be moved by being fitted in the path portion, wherein the link portion is disposed to rotate as the first body and the second body move from the second state to the released state so as to change the first body and the second body to the stroke state.

For another example, the link portion may include a link rear cover coupled to one side surface of the second body, a link front cover disposed to be relatively rotatable with respect to the link rear cover and coupled to the link rear cover, and a link spring interposed between the link rear cover and the link front cover to press the link front cover so as to rotate the link front cover in one direction, wherein the link front cover further includes an extension portion extending in any one direction, and the link spring presses one side of the extension portion to rotate the link front cover.

For another example, the link rear cover may include a spring hook portion protruding from one side to engage with the link spring, wherein the link spring includes a coil portion wound in a plurality and caught in the spring hook portion, and a coil protruding portion protruding from the coil portion toward the extension portion, the extension portion includes a spring engaging portion protruding from one surface to engage with the coil protruding portion, and the link spring is caught in the spring engaging portion to apply a force in a direction of rotating the link front cover.

For another example, at least part of the link front cover and the link rear cover may be defined in a partial circumferential shape, wherein the link rear cover includes a first engaging portion protruding toward the link front cover, and the link front cover includes a first protrusion protruding to limit rotation as being caught in the first engaging portion.

For another example, the link rear cover may include a rotation guide protruding toward the link front cover along a circumference of the link rear cover to guide the rotation of the link front cover, and a second engaging portion bent at both end portions of the rotation guide to protrude from the rotation guide, and caught in the link front cover to limit the rotation of the link front cover.

For another example, the link front cover may include a rotation protrusion portion protruding outward to correspond to the rotation guide, and a second protrusion protruding from one end of the rotation protrusion portion to be caught in the second engaging portion when the link front cover is over-rotated.

For another example, the link portion may further include a first link rivet inserted into the center of the link rear cover and the center of the link front cover, and inserted into the second body, and a second link rivet inserted into an extension portion of the link rear cover, and caught in the path portion to move along a surface constituting the path portion.

For another example, the path portion may include a path groove that is open in a width direction of the first body, wherein the path groove includes a first groove into which the second link rivet is inserted to limit the rotation of the link front cover in the first state, a second groove in which the link front cover is rotatably recessed downward in one direction in the second state, and a third groove configured to be recessed such that the second link rivet is inserted thereinto, and the first body and the second body move away from each other in the released state.

For another example, the path portion may include a first surface constituting a lower surface of the path groove, a second surface connected from the first groove to the second groove and inclined so as to allow the link front cover to rotate upward, a third surface constituting an upper surface of the path groove, and a fourth surface inclined so as to allow the link front cover to rotate downward.

For another example, the link portion may be configured such that the second link rivet moves along the second surface to rotate the link front cover as the second link rivet is inserted into the second groove and then the second body and the first body are pressed in directions of moving away from each other.

For another example, the link portion may be configured to implement either one of a locking state in which the first engaging portion is caught in the first protrusion to restrict the rotation of the link front cover in one direction due to a pressure by the link spring, and an unlocking state in which the link front cover is placed in a state capable of rotating in the one direction, wherein the link portion moves to the unlocking state in the process of changing from the first state to the second state, and the link portion is configured to change to the locking state due to the first engaging portion being caught in the first protrusion in the process of changing from the second state to the released state.

For another example, the link portion may be configured to maintain a locking state in the stroke state of moving toward the first state from the released state, and change from the locking state to the unlocking state due to the rotation of the link front cover as moving along the fourth surface.

Advantageous Effects of Invention

The effects of the present disclosure obtained through the foregoing solutions are as follows.

First, as a link module constrains a first body and a second body to each other, the first body and the second body may not move closer to or away from each other by an external force generated during use, thereby increasing convenience in use. Furthermore, even when a flexible display device drops toward the ground, a sudden movement of the first body and the second body due to an external force may be prevented or reduced, thereby having an advantage of protecting parts that move the first body and the second body away from or closer to each other.

Second, a rotation range of a link front cover may be limited by first and second engaging portions disposed on a link rear cover, and first and second protrusions disposed on the link front cover. Accordingly, there is an effect of preventing or reducing a link portion from being over-rotated.

Third, unintentional switching between a first state and a second state by a higher external force generated from a section moving from the second state to a released state and a higher external force generated from a section in which the link portion moves from a locking state to an unlocking state again may be prevented or reduced. In addition, there is an advantage capable of allowing a user to sensibly recognize switching to the first state and the second state by an external force required when switching to the first state and the second state.

Fourth, as a second link rivet is inserted into a second groove, and an extension portion is pressed downward by a link spring in the second state, the first body and the second body may be prevented or reduced from being relatively rotated in directions misaligned from each other.

Figure 2:
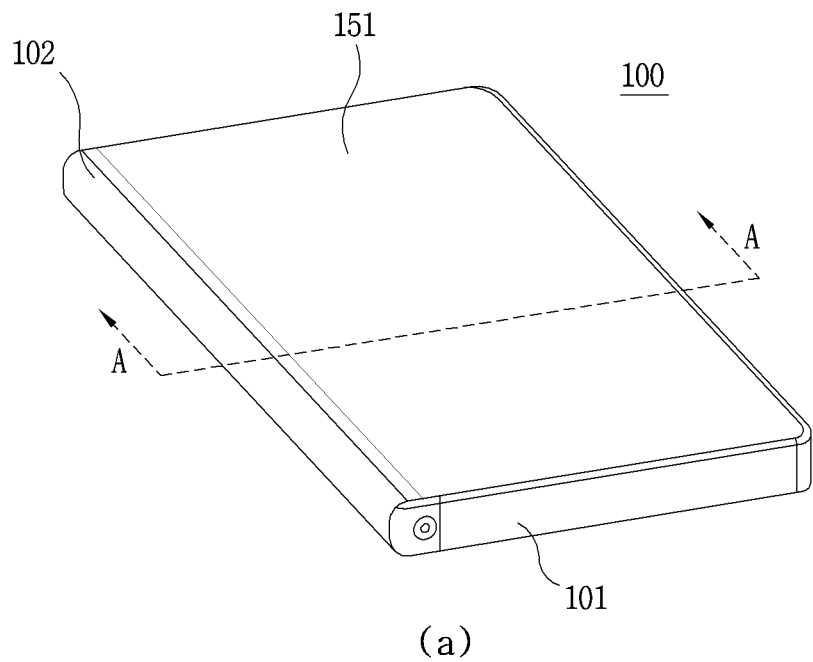
Figure 2:
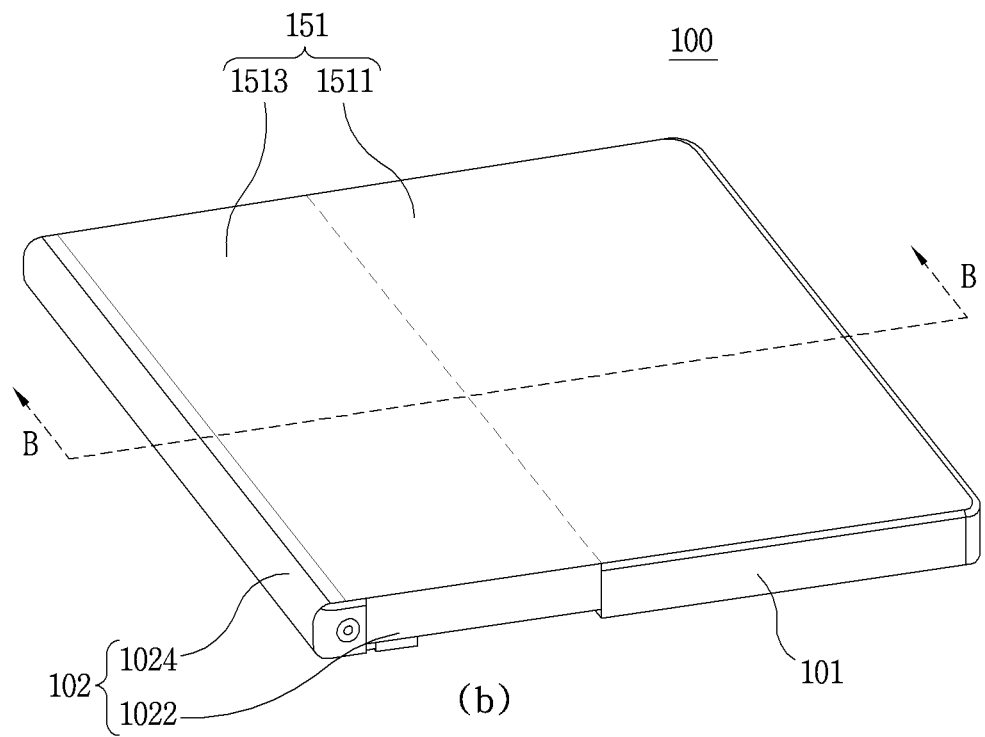

(a) of FIG. 2 is a perspective view showing an exterior of a front surface portion of a flexible display device in a first state.

(b) of FIG. 2 is a perspective view showing an exterior of the front surface portion of the flexible display device in a second state.

Figure 3:
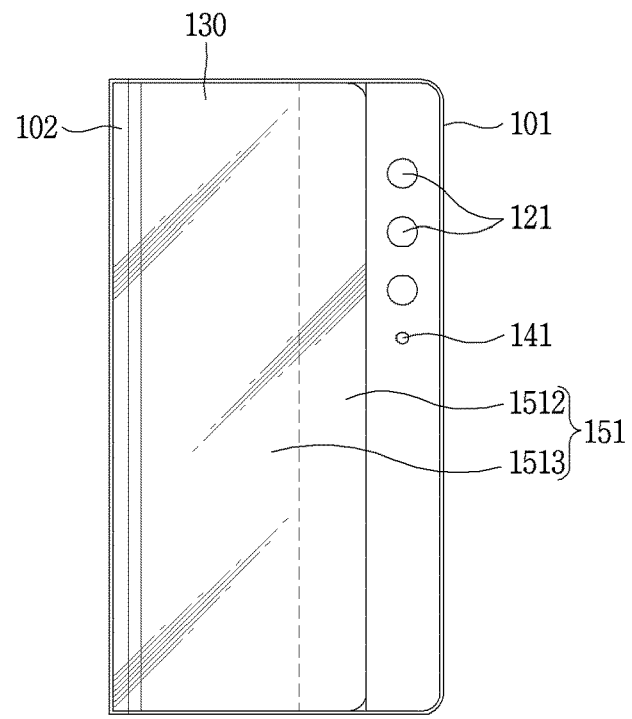
Figure 3:
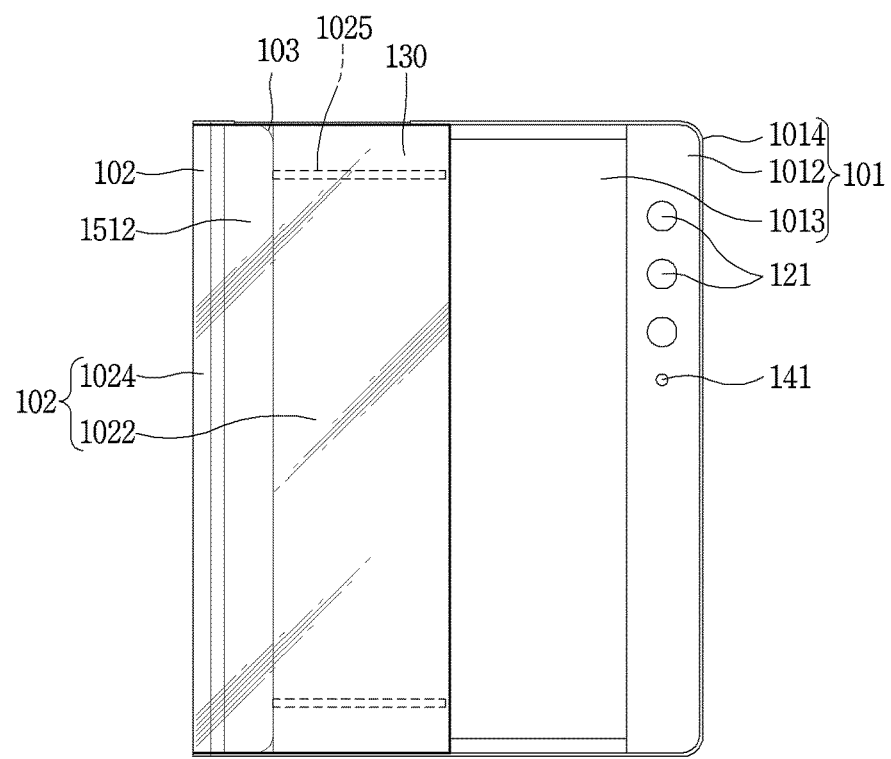

(a) of FIG. 3 is a perspective view showing an exterior of a rear portion of the flexible display device in a first state.

(b) of FIG. 3 is a perspective view showing an exterior of the rear portion of the flexible display device in a second state.

Figure 4:
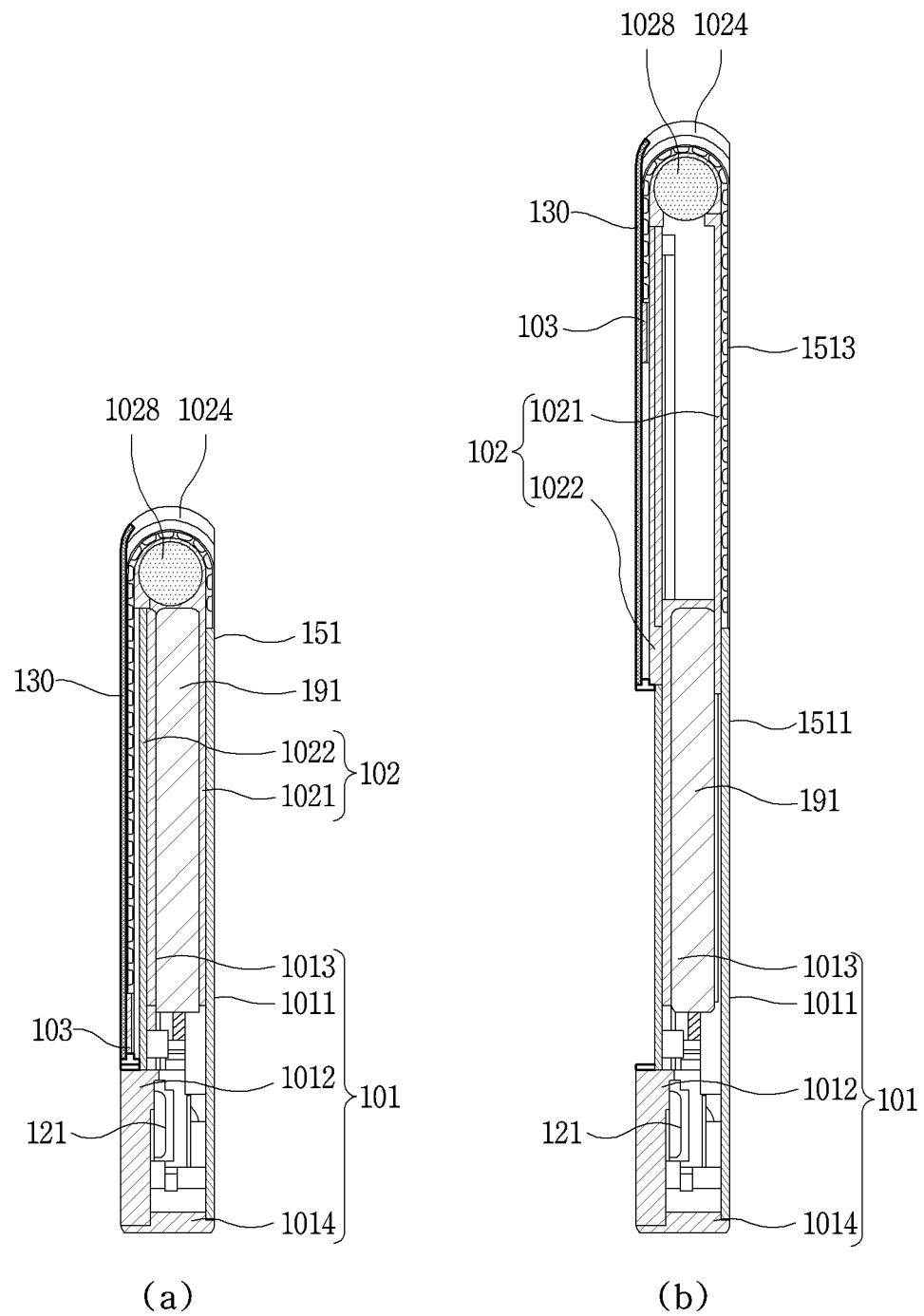

(a) and (b) of FIG. 4 are cross-sectional views of the flexible display device in a first state and a second state, respectively.

Figure 5:
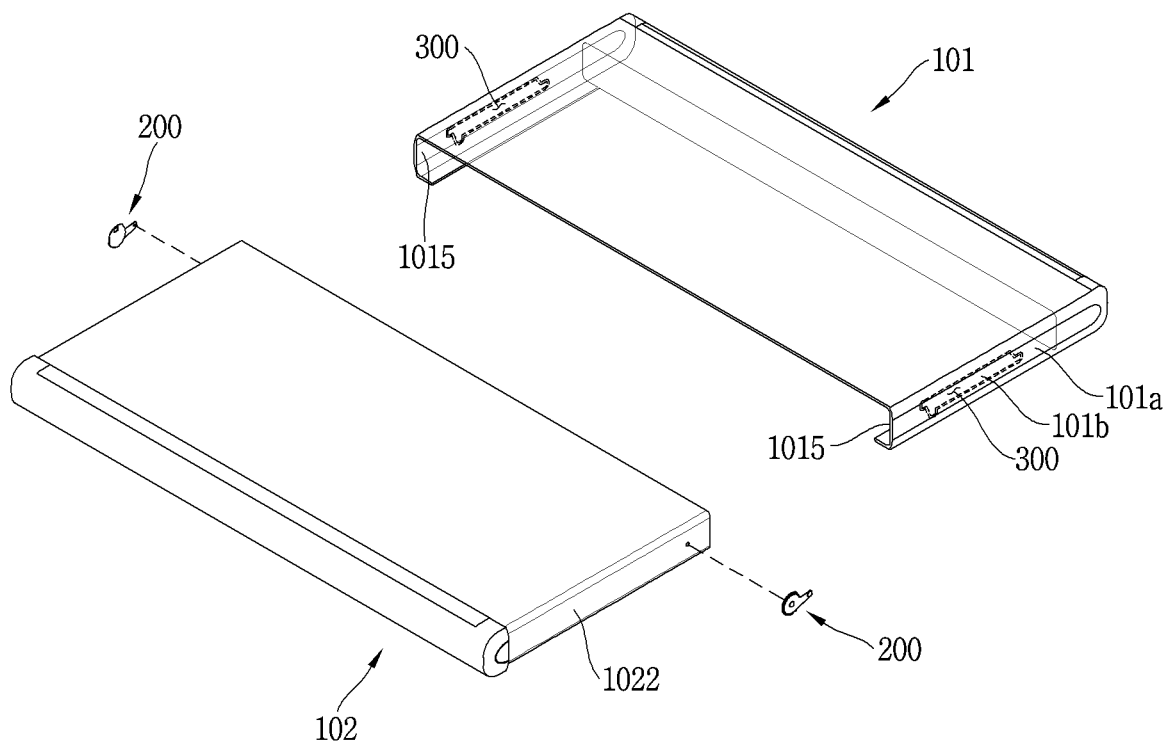

FIG. 5 is an exploded perspective view showing a first body and a second body according to an embodiment of the present disclosure.

Figure 6:
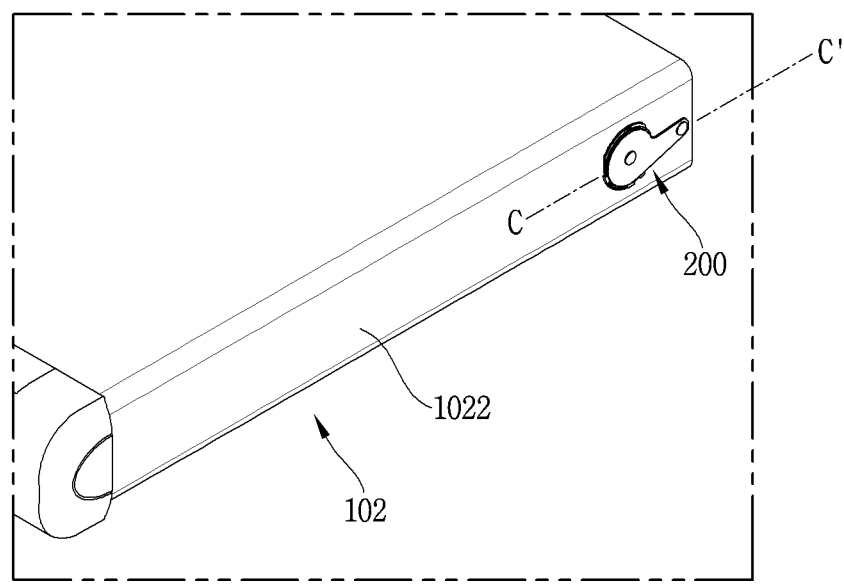
Figure 6:
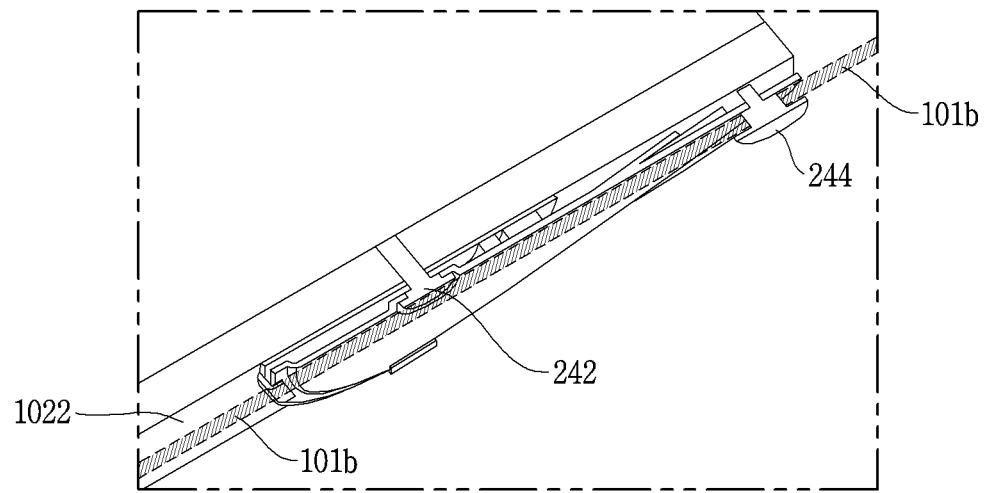

(a) of FIG. 6 is a perspective view showing a shape in which a link portion is coupled to the second body illustrated in FIG. 5.

(b) of FIG. 6 is a view showing a shape taken along line C-C' of FIG. 5.

Figure 7:
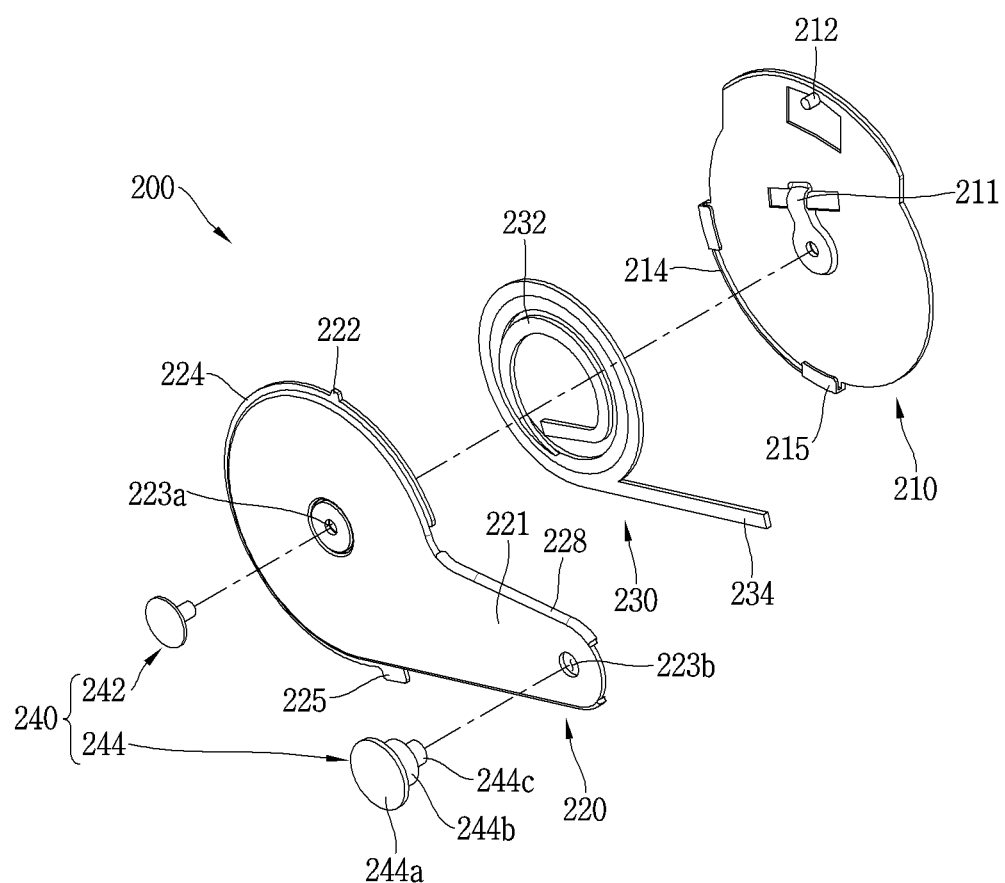

FIG. 7 is an exploded perspective view showing a shape in which a link portion according to an embodiment of the present disclosure is disassembled.

Figure 8:
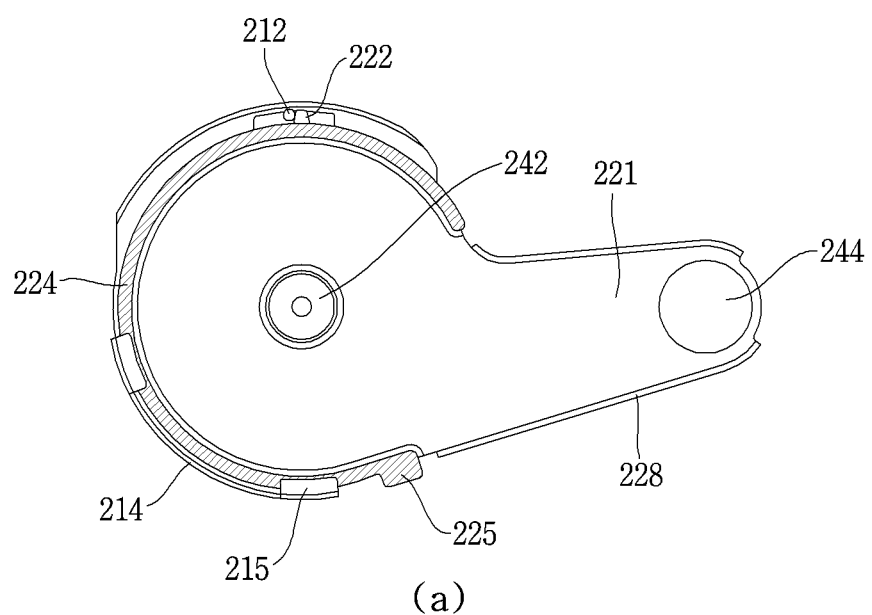
Figure 8:
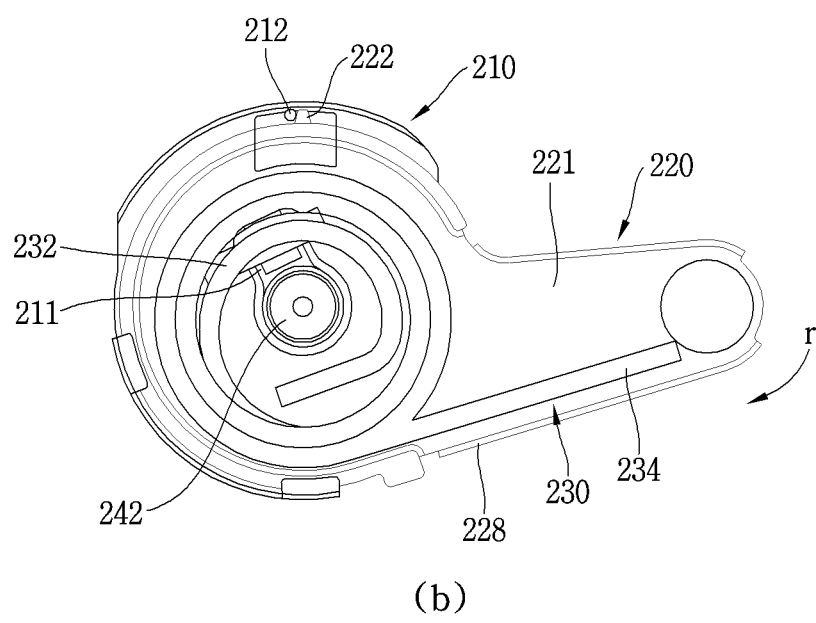

FIG. 8 is a plan view of the link portion of FIG. 7 and a view showing a perspective view of a link front cover.

Figure 9:
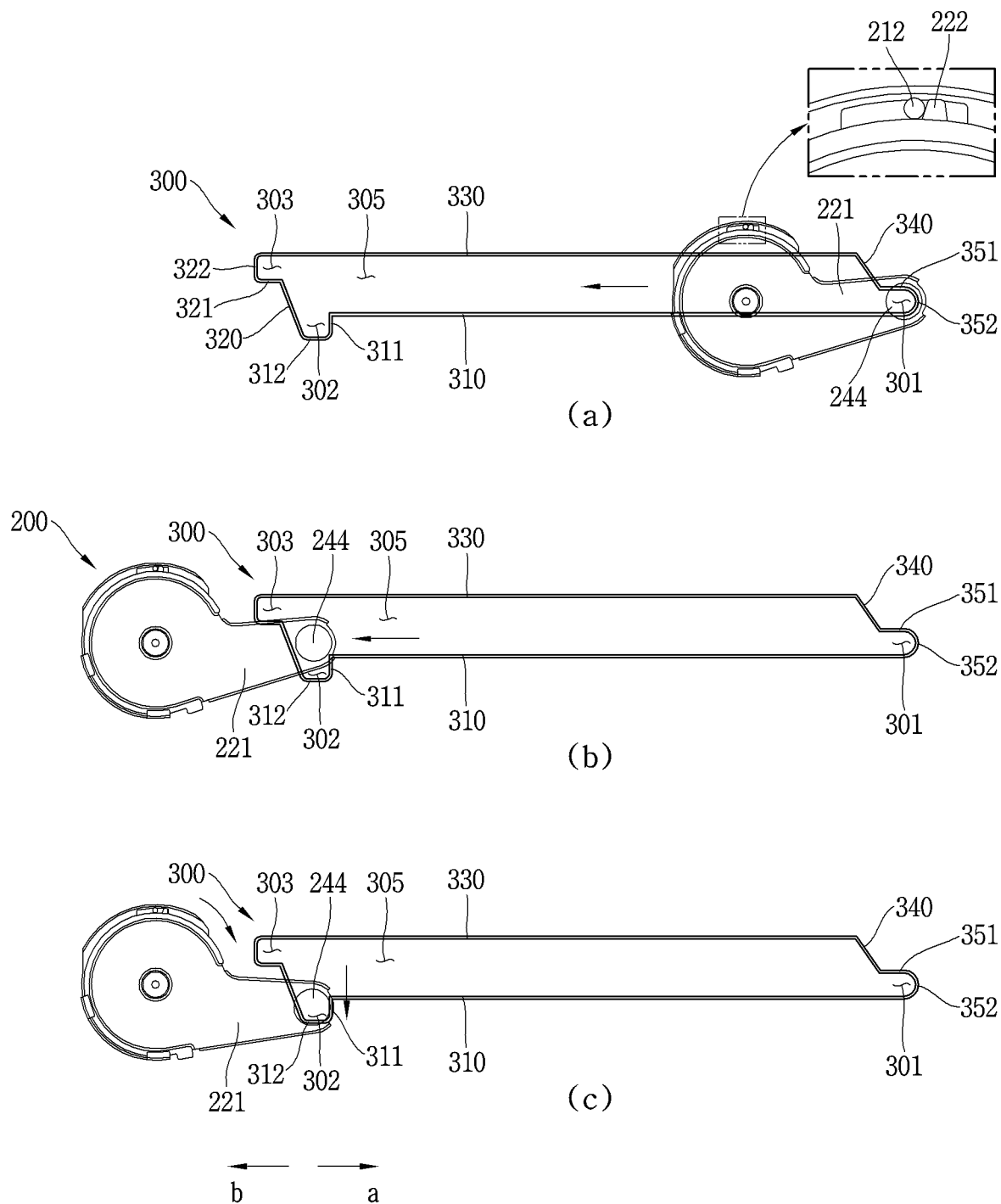

FIG. 9 is a conceptual view showing a shape in which the link portion moves along a path portion from a first state to a second state.

Figure 10:
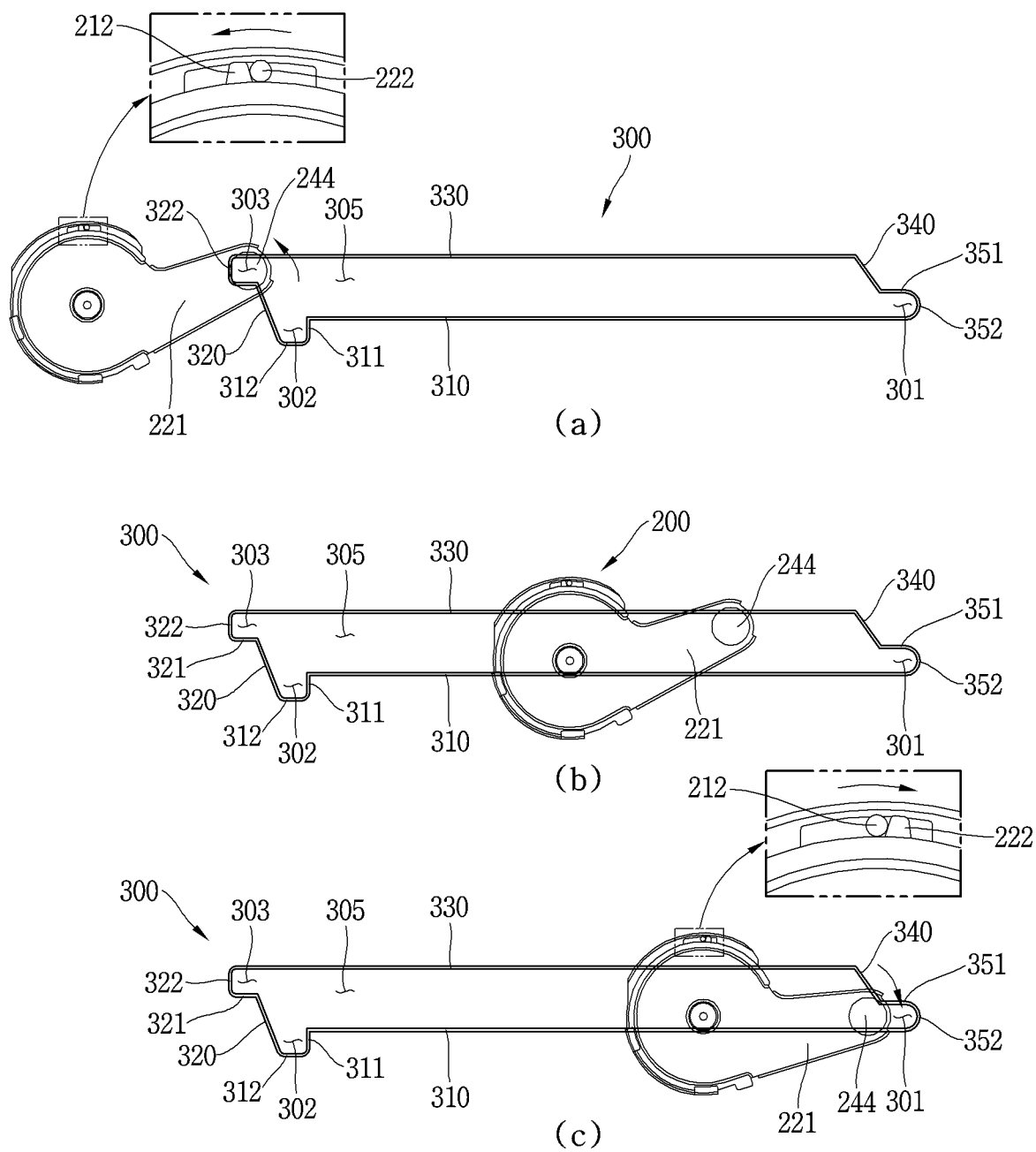

FIG. 10 is a conceptual view showing a shape in which a link portion moves along a path portion from a released state to a first state.

Figure 11:
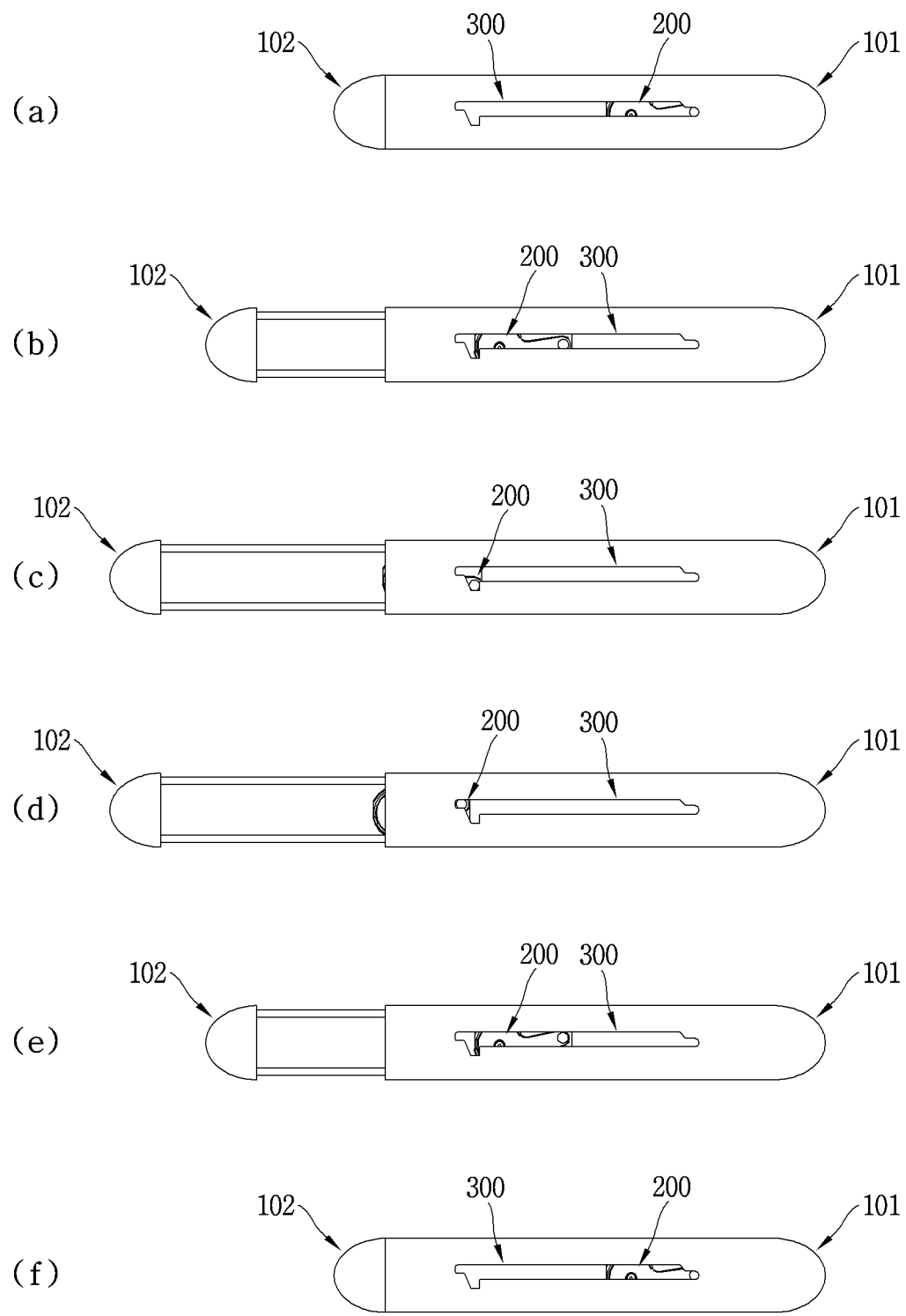

FIG. 11 is a conceptual view showing a shape in which a first body and a second body are switched from a first state to a second state.

MODE FOR THE INVENTION

Description will now be given in detail according to exemplary embodiments disclosed herein, with reference to the accompanying drawings. For the sake of brief description with reference to the drawings, the same or equivalent elements may be provided with the same or similar reference numbers, and description thereof will not be repeated. A suffix "module" and "unit" used for elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

The terms including an ordinal number such as first, second, etc. can be used to describe various elements, but the elements should not be limited by those terms. These terms are generally only used to distinguish one element from another.

It will be understood that when an element is referred to as being "connected with" another element, the element can be connected with the other element or intervening elements may also be present. On the contrary, in case where an element is "directly connected" or "directly linked" to another element, it should be understood that any other element is not existed therebetween.

A singular representation may include a plural representation unless it represents a definitely different meaning from the context.

Terms "include" or "has" used herein should be understood that they are intended to indicate the existence of a feature, a number, a step, an element, a component or a combination thereof disclosed in the specification, and it may also be understood that the existence or additional possibility of one or more other features, numbers, steps, elements, components or combinations thereof are not excluded in advance.

Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultrabooks, wearable devices (for example, smart watches, smart glasses, head mounted displays (HMDs), and the like.

However, it may be easily understood by those skilled in the art that the configuration according to the exemplary embodiments of the present specification can also be applied to stationary terminals such as digital TV, desktop computers, digital signages, and the like, excluding a case of being applicable only to the mobile terminals. Hereinafter, a mobile terminal will be described as an example of a flexible display device for convenience of description in the present specification.

Figure 1:
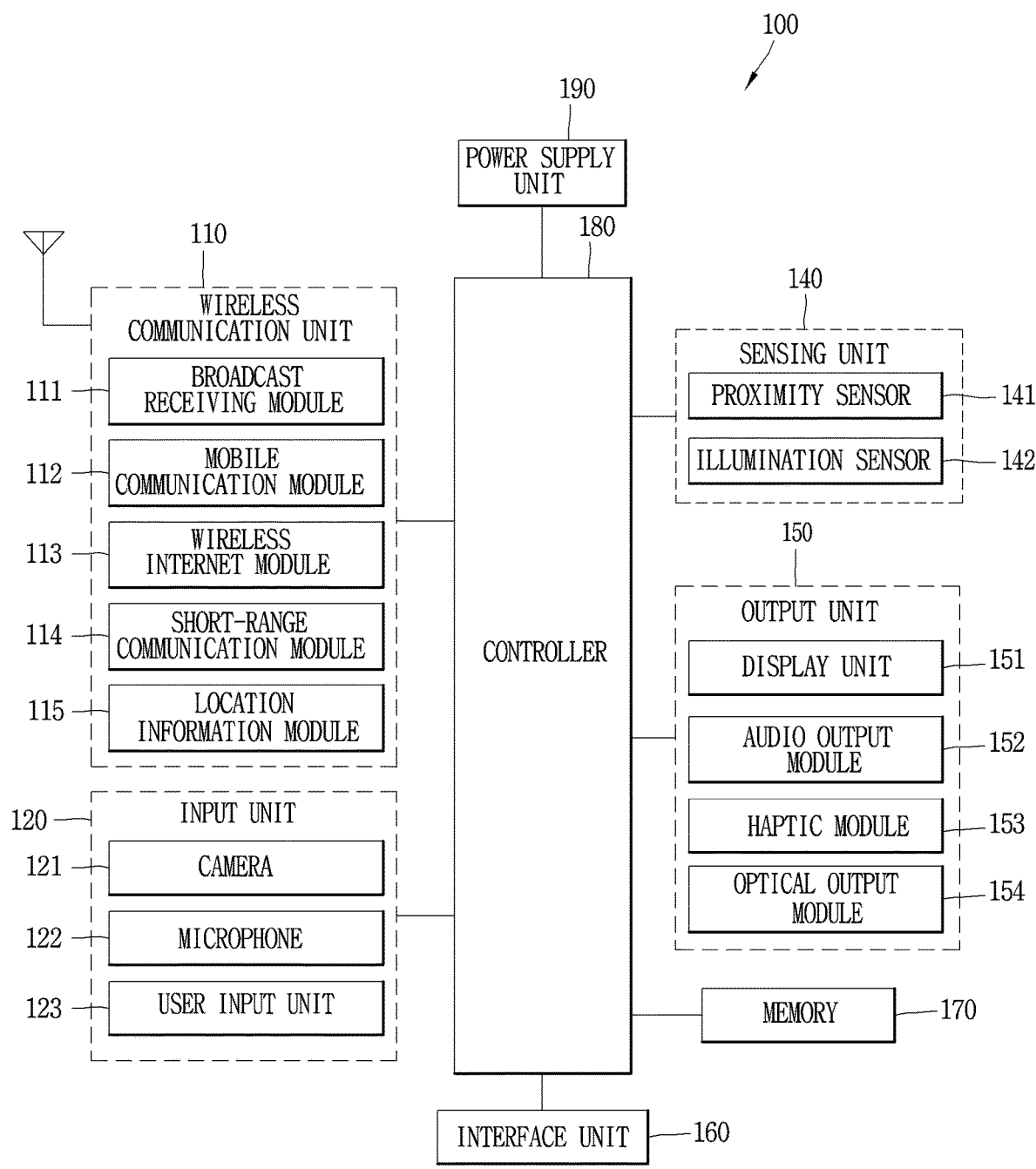
FIG. 1 is a block diagram for explaining a mobile terminal associated with the present disclosure.

FIG. 1 is a block diagram for explaining a mobile terminal associated with the present disclosure.

The mobile terminal 100 may be shown having components such as a wireless communication unit 110, an input unit 120, a sensing unit 140, an output unit 150, an interface unit 160, a memory 170, a controller 180, and a power supply unit 190. The elements shown in FIG. 1 are not essential for implementing a mobile terminal, and thus the mobile terminal described herein may have more or fewer elements than those listed above.

In more detail, the wireless communication unit 110 of those elements may typically include one or more modules which permit wireless communications between the mobile terminal 100 and a wireless communication system, between the mobile terminal 100 and another mobile terminal 100, or between the mobile terminal 100 and an external server. Further, the wireless communication unit 110 may typically include one or more modules which connect the mobile terminal 100 to one or more networks.

The wireless communication unit 110 may include one or more of a broadcast receiver 111, a mobile communication module 112, a wireless Internet module 113, a short-range communication module 114, and a location information module 115.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel, a terrestrial channel, or both. At least two broadcast receiving modules 111 may be provided in the mobile terminal 100 to simultaneously receive at least two broadcast channels or switch the broadcast channels.

The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast signal may be encrypted by at least one of technical standards (or broadcasting methods, e.g., ISO, IEC, DVB, ATSC, etc.) for transmitting and receiving a digital broadcast signal.

The broadcast receiving module 111 may receive the digital broadcast signal using a method suitable for a technical standard selected from those technical standards. Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. The broadcast signal and/or the broadcast related information received through the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. For another example, when the mobile terminal uses the Wi-Fi module, a position of the mobile terminal may be acquired based on information associated with a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function executed in the mobile terminal 100. The microphone 122 may include assorted noise removing algorithms to remove unwanted noise generated in the course of receiving the external audio signal.

The user input unit 123 is a component that receives an input of information from a user. Such user input may enable the controller 180 to control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from two or more sensors of the sensing unit 140, and combinations thereof.

The proximity sensor 141 refers to a sensor to sense presence or absence of an object approaching a surface, or an object existing near a surface, by using an electromagnetic field, infrared light, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

The touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, a signal(s) corresponding to the touch input is transmitted to a touch controller. The touch controller may process the received signals, and then transmit corresponding data to the controller 180. Accordingly, the controller 180 may sense which area of the flexible display 151 has been touched. Here, the touch controller may be an element separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

In addition, the controller 180 may be a processor that drives various applications executed in the flexible display device. For example, various applications including a camera application executed in the flexible display device may be driven.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. For instance, the position of the wave generation source may be calculated using the time difference from the time that the ultrasonic wave reaches the sensor based on the light as a reference signal.

The camera 121, which has been depicted as a component of the input unit 120, includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The flexible display 151 is generally configured to output information processed in the mobile terminal 100. For example, the flexible display 151 may display execution screen information of an application program executing at the mobile terminal 100 or user interface (UI) and graphic user interface (GUI) information in response to the execution screen information.

Also, the flexible display 151 may be implemented as a stereoscopic display for displaying stereoscopic images.

The stereoscopic display may employ a stereoscopic display scheme such as stereoscopic scheme (a glass scheme), an auto-stereoscopic scheme (glassless scheme), a projection scheme (holographic scheme), or the like.

The output unit 150 may typically be configured to output various types of information, such as audio, video, tactile output, and the like. The output unit 150 may include at least one of the flexible display 151, an audio output module 152, a haptic module 153, and an optical output module 154. The flexible display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The audio output module 152 may output audio data received from the wireless communication unit 110 or stored in the memory 160 in a call signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented such that the mobile terminal emits monochromatic light or light with a plurality of colors. The signal output may be terminated as the mobile terminal senses that a user has checked the generated event, for example.

The interface unit 160 may serve as an interface with various types of external devices connected with the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The identification module may be a chip that stores various information for authenticating authority of using the mobile terminal 100 and may include a user identity module (UIM), a subscriber identity module (SIM), a universal subscriber identity module (USIM), and the like. In addition, a device having the identification module (hereinafter, an "identification device") may be fabricated in the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Such various command signals received from the cradle or the power may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may also be operated in relation to a network storage device that performs the storage function of the memory 170 over a network, such as the Internet.

The controller 180 functions to control an overall operation of the mobile terminal 100, in addition to the operations associated with the application programs. The controller 180 may provide or process information or functions appropriate for a user by processing signals, data, information and the like, which are input or output through the aforementioned various elements, or activating application programs stored in the memory 170.

Also, the controller 180 may control at least some of the elements illustrated in FIG. 1 to execute an application program that have been stored in the memory 170. In addition, the controller 180 may control at least two of those elements included in the mobile terminal 100 to activate the application program.

The power supply unit 190 may be configured to receive external power or provide internal power in order to supply appropriate power required for operating elements included in the mobile terminal 100. The power supply unit 190 may include a battery 191, and the battery may be configured to be embedded in the terminal body, or configured to be detachable from the terminal body.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

At least part of the elements may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

(a) and (b) of FIG. 2 are perspective views showing an exterior of a front surface portion of the flexible display device in a first state and in a second state, respectively. (a) and (b) of FIG. 3 are perspective views showing an exterior of a rear surface portion of the flexible display device in the first state and in the second state, respectively.

The flexible display device is a device capable of varying in size of a screen due to a deformation of the flexible display, which may be understood as one of the above-described mobile terminals. In the present disclosure, the device will be referred to as a flexible display device 100.

The flexible display device 100 according to the present disclosure may include a first body 101, a second body 102, the flexible display 151, and a rear cover glass 130.

The first body 101 and the second body 102 may define an exterior appearance of the flexible display device 100. The first body 101 and the second body 102 are configured to be movable relative to each other. The first body 101 and the second body 102 may achieve the first state, the second state, and a stroke state.

Specifically, the first state is an arrangement state in which the first body 101 and the second body 102 are located adjacent to each other and have a largest area of the flexible display 151 exposed to the rear surface of the second body 102. The second state is an arrangement state in which the first body 101 and the second body 102 move away from each other and have a largest area of the flexible display 151 exposed to a front surface of the first body 101. The stroke state is a state in which the first body 101 and the second body 102 are switched between the first state and the second state.

The flexible display device 100 in the first state has a shorter length in a first direction than in the second state. Since the flexible display device 100 in the second state is extended in the first direction, a size of the flexible display 151 disposed on the front surface of the flexible display device 100 become larger than in the first state. A direction in which the flexible display device 100 is extended is referred to as a first direction, and a direction in which the flexible display device 100 is contracted to be switched from the second state to the first state is referred to as a second direction. And a direction perpendicular to the first direction and the second direction is referred to as a third direction.

The flexible display device 100 of the present disclosure may be switched from the first state in which a display is disposed on a front surface such as a bar-like mobile terminal to the second state by extending the screen as illustrated in (b) of FIG. 2. In the second state, the area of the flexible display 151 located at the front surface increases, and the area of the display located at the rear surface decreases as illustrated in (b) of FIG. 3. That is, the display, which was positioned on the rear surface in the first state, is moved to the front surface in the second state.

As such, the display may use the flexible display 151 that is bendable so as for the location of the display can be changed. The flexible display 151 refers to a durable display that is lightweight and does not break easily by being fabricated on a thin, flexible substrate, such as paper, which is bent, curved, folded, twisted or rolled while maintaining characteristics of an existing flat panel display.

In addition, an electronic paper is a display to which general ink characteristics are applied, and is different from the existing flat panel display in view of using reflected light. The electronic paper may change information by using a twist ball or electrophoresis using a capsule.

In a state where the flexible display 151 is not deformed (e.g., a state having an infinite radius of curvature, hereinafter, referred to as a default state), a display area of the flexible display 151 is flat. When the default state is switched to a state where the flexible display is deformed by an external force (e.g., a state having a finite radius of curvature, hereinafter, referred to as a deformed state), the display area may be curved. As illustrated in the drawing, information displayed in the deformed state may be visual information output on a curved surface. The visual information may be implemented in such a manner that a light emission of each unit pixel (sub-pixel) arranged in a matrix configuration is controlled independently. The unit pixel denotes an elementary unit for representing one color.

Meanwhile, the flexible display 151 may be combined with a touch sensor to implement a flexible touch screen. When an external force is applied to the flexible display 151 in a bent state, the flexible display 151 may be deformed back into a flat state (or less curved state) or into a more curved state.

On the other hand, the flexible display 151 may implement a flexible touch screen using a touch sensor in combination with a touch sensor. When a touch is input onto the flexible touch screen, the controller 180 (see FIG. 1A) may execute a control corresponding to the touch input. The flexible touch screen may be configured to sense a touch input in the deformed state as well as in the default state.

The touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

Meanwhile, the flexible display device 100 according to this varied example may be provided with a deformation detecting unit to detect a deformation of the flexible display 151. The deformation sensor may be included in the sensing unit 140 (see FIG. 1A).

The deformation sensor may be provided in the flexible display 151 or a case 105 to sense information related to the deformation of the flexible display 151. Here, the information related to the deformation may be a direction in which the flexible display 151 is deformed, a deformed degree, a deformed position, a deformed time, and an acceleration at which the deformed flexible display 151 is restored. In addition, the information may be various which is detectable as the flexible display 151 is curved.

Also, the controller 180 may change information displayed on the flexible display 151 or generate a control signal to control functions of the flexible display device 100 based on the information related to the deformation of the flexible display 151 detected by the deformation detecting unit.

The configuration deformation of the display 151 may not be necessarily limited to an external force. For example, when the flexible display 151 is in the first state, the flexible display 151 may be deformed to the second state by a command of an application or a user. As such, a driving unit may be further provided to deform the flexible display without an external force.

The flexible display 151 of the present disclosure may be bent 180 degrees, so as a part of which to be located at the front surface of the flexible display device 100, and a part of which to be located in the rear surface of the flexible display device 100. Since a size of an entire area of the flexible display 151 is fixed, when the area of the flexible display 151 located on the front surface of the flexible display device 100 increases, the area of the flexible display 151 located on the rear surface of the flexible display device 100 relatively decreases.

As the flexible display 151 is disposed up to the rear surface of the flexible display device 100, in addition to the front surface of the flexible display device 100, a space where an antenna implemented in a rear case in the related art to be mounted is limited. Accordingly, the antenna may be implemented on the flexible display 151 instead of mounting the antenna in the rear case.

A display built-in antenna (AOD, Antenna on Display) is an antenna in which patterned electrode layers and dielectric layers form a transparent film. The display built-in antenna can be implemented thinner than the related art antenna implemented by copper-nickel plating laser direct structuring (LDS) technology, which has an advantage of not appearing outside and barely affecting the thickness. In addition, the display built-in antenna is able to transmit and receive a signal in a direction in which the display is located. Such a display built-in antenna may be used in a terminal having a display on both sides as in the present disclosure.

Referring to FIG. 3, the rear cover glass 130 may be coupled to the second body 102. When the second body 102 is moved relative to the first body 101 so as for the first body 101 and the second body 102 to achieve the second state, the rear cover glass 130 is moved together with the second body 102.

Accordingly, the rear cover glass 130 is configured to cover the flexible display 151 disposed on the rear surface of the second body 102 in the first state, and to cover an inner portion of the second body 102 disposed on an inner surface of the second body 102 in the second state.

The rear cover glass 130 may be mounted on the second body 102 to protect the flexible display 151 disposed on the rear surface from outside. In addition, the rear cover glass 130 may be detached from the second body 102 to expose the flexible display 151. In this manner, a user may remove dust or the like introduced between the rear cover glass 130 and the flexible display 151.

(a) of FIG. 4 is a cross-sectional view taken along a line A-A in (a) of FIG. 2, and (b) of FIG. 4 is a cross-sectional view taken along a line B-B in (b) of FIG. 2.

FIG. 4 is a cross-sectional view of the A-A and B-B of FIG. 2, wherein the flexible display device 100 according to the present disclosure includes the first body 101, the second body 102 that slides in the first direction with respect to the first body 101, and a supporting plate 103 that slides in the first direction with respect to the second body 102. Hereinafter, a description will be given with reference to FIGS. 2 and 3.

The first body 101 and the second body 102 may include the front surface, the rear surface, and the side surface, and may define an exterior of the flexible display device 100 in a hexahedral shape.

A first region 1511 disposed at one side of the flexible display 151 is fixed to the front surface of the first body 101. A third region 1513 neighboring the first region 1511 in the first direction may partially cover the front surface of the second body 102 and partially cover the rear surface of the second body 102.

A second region 1512 disposed at another side of the flexible display 151 is disposed at a rear surface of the mobile terminal. The second region 1512 is coupled to the supporting plate 103 rather than directly coupled to the second body 102. The supporting plate 103 is a plate-like member slidably coupled to the rear surface of the second body 102 in the first direction.

As illustrated in (b) of FIG. 3, a slide slot 1025 extending in the first direction is formed at the second body 102. The supporting plate 103 may move along the slide slot 1025. However, although the slide slot 1025 is illustrated as being formed at the rear surface of the second body 102 in the drawing, the slide slot 1025 may alternatively be formed at the side surface of the second body 102.

To sum up, the flexible display 151 may include the first region 1511 fixed to the first body 101, the second region 1512 fixed to the supporting plate 103, and the third region 1513 located between the first region 1511 and the second region 1512 and disposed on the front surface or the rear surface according to a state of the flexible display device 100.

The first region 1511 and the second region 1512 of the flexible display 151 maintain a default state which is flat and the curvature does not change in a process of changing between the first state and the second state of the flexible display device 100. Meanwhile, the third region 1513 is bent at another side of the second body 102 and curved to the rear surface.

When switching from the first state to the second state, an area of the third region 1513 located in the first direction of the first region 1511 is widened. A position being bent on the third region 1513 is correspondingly changed according to a sliding position of the second body 102.

Since a foldable mobile terminal or a flexible display device that unfolds like a book repeatedly bends only a specific position, a force is repeatedly applied to only one spot, causing a high risk of damage. On the other hand, the flexible display device 100 of the present disclosure can reduce a fatigue caused by a deformation that is intensively applied only to a specific spot of the flexible display 151 in the process of switching between the first state and the second state. Accordingly, the flexible display device 100 of the present disclosure can prevent damage caused by fatigue accumulation of the flexible display 151.

The first body 101 may include a first front surface portion 1011, a first rear surface portion 1012, and a second rear surface portion 1013. The first front surface portion 1011 is coupled to the first region 1511 of the flexible display 151. The first rear surface portion 1012 is exposed from the rear surface of the first body 101 to an outer side in the first state as shown in (a) of FIG. 3. As shown in (b) of FIG. 3, the second rear surface portion 1013 is covered by the second and third regions of the flexible display in the first state, and is exposed to the outside in the second state.

Since the first rear surface portion 1012 is always exposed to the outside, the camera 121, a flash, the proximity sensor 141, and the like may be disposed on the first rear surface portion 1012.

Since a typical bar-like terminal has a display on only one side thereof, cameras are required on both a rear surface and a front surface of the terminal to capture an image of an object located at an opposite side of a user or an image of the user him/herself. However, since the flexible display 151 is also located on the rear surface of the flexible display device 100 of the present disclosure, capturing an image of an object located at an opposite side of a user or an image of the user him/herself is possible by using one camera.

In detail, since the display is visually disposed on both the front surface and the rear surface of the flexible display device 100, a user can take a picture while viewing the front surface of the flexible display device 100. In addition, the user may take a picture with the camera facing the user while viewing the rear surface of the flexible display device 100.

The camera 121 may include a plurality of cameras having different angles of view, such as wide angle, ultra-wide angle, and telephoto. In addition to the camera 121, the proximity sensor 141, an audio output module, and the like may be provided. An antenna 116 may be implemented on the first rear surface portion 1012.

The first body 101 may include a side surface portion 1014 surrounding a circumference of the flexible display device 100. The first body 101 covers side surfaces of both sides of the third direction and a side surface of one side of the first direction except for an end portion of the first direction where the second body 102 is inserted into and drawn out, and defines an exterior of the flexible display device 100. An interface unit to connect a power port or an ear jack or a user input unit such as a volume button may be disposed on the side surface portion 1014. In a case of including a metal material, the side surface may serve as an antenna.

The second body 102 may include a second front surface portion 1021, a third rear surface portion 1022, and a side frame 1024.

The second front surface portion 1021 is disposed on a rear surface of a first front surface portion 1011 of the first body 101. The second front surface portion 1021 supports a rear surface of the flexible display 151 that is extended in the front surface portion when the flexible display device 100 is switched from the first state to the second state. That is, the second front surface portion 1021 supports the third region 1513 disposed on the front surface of the flexible display 151 in the second state.

The third rear surface portion 1022 covers a rear surface of the second rear surface 1 portion 013 of the first body 101. The foregoing slide slot 1025 may be disposed on the third rear surface portion 1022. The third rear surface portion 1022 is not exposed to the outside in the first state of the flexible display device 100, but may be exposed to the outside when the flexible display device 100 is switched to the second state.

A user input may be performed on a side surface of the flexible display device 100 by using a touch sensor of the flexible display 151. The side frame 1024 may partially include a conductive material for touch input. A protrusion may be provided on a portion including the conductive material so that a user may touch the protrusion to input a user command.

A cylindrical roller 1028 may be provided at an end portion of the second body 102 in the first direction so that the third region 1513 of the flexible display 151 is wound around the roller 1028 and the wound part may be gently curved with a predetermined curvature.

The roller 1028 is positioned at the end portion of the second body 102 in the first direction, brought into contact with an inner surface of the flexible display 151, and rotated when the flexible display 151 moves so that the flexible display 151 slides smoothly from the rear surface to the front surface or vice versa when the second body 102 slides.

Since the flexible display 151 wound on the roller 1028 is located at an end portion of the flexible display device 100 in the first direction, the flexible display device 100 may be broken when an impact such as dropping the flexible display device 100 is applied thereto. To prevent a breakage, the second body 102 may further include the side frame 1024 to protect the flexible display 151 wound on the roller 1028 as illustrated in FIG. 2.

The side frame 1024 may prevent a breakage problem that occurs when a bent surface of the flexible display 151 in an out-folding manner is exposed to the outside, thereby improving durability of the flexible display device 100.

The side frame 1024 surrounds a bent end portion of the flexible display 151 at another side of the flexible display device 100 to protect the flexible display 151 wound on the roller 1028. The side frame 1024 may include an opaque material or a transparent material, or may be configured by mixing an opaque material and a transparent material. A user may view an image or a text output from the flexible display 151 through a transparent portion.

FIG. 5 is an exploded perspective view showing the first body 101 and the second body 102 according to an embodiment of the present disclosure. (a) of FIG. 6 is a perspective view showing a shape in which the link portion 200 is coupled to the second body 102 illustrated in FIG. 5. (b) of FIG. 6 is a view showing a shape taken along line C-C' of FIG. 5.

The flexible display device 100 according to an embodiment of the present disclosure includes link modules 200, 300 that guide the first body 101 and the second body 102 to move relative to each other.

The link modules 200, 300 fix the first body 101 and the second body 102 to each other to prevent or reduce the first body 101 and the second body 102 from moving closer to or away from each other when the first body 101 and the second body 102 are spaced apart by a preset distance.

Specifically, when the first body 101 and the second body 102 in the first state as shown in (a) of FIG. 2 are spaced apart by a preset distance as shown in (b) of FIG. 2, the link modules 200, 300 may fix the first body 101 and the second body 102 to each other to prevent or reduce the first body 101 and the second body 102 from moving closer to or away from each other.

The link modules 200, 300 may fix the first body 101 and the second body 102 to each other in the second state, thereby preventing or reducing the first body 101 and the second body 102 from being switched to a stroke state. Specifically, when the link modules 200, 300 fix the first body 101 and the second body 102 to each other in the second state as shown in (b) of FIG. 2, the first body 101 and the second body 102 do not move closer to or away from each other.

The user may use the flexible display device 100 in a state in which the first body 101 and the second body 102 are fixed to each other in the second state. Moreover, the first body 101 and the second body 102 may not move closer to or away from each other due to an external force generated during use, thereby increasing convenience in use. Furthermore, even when the flexible display device 100 drops toward the ground, a sudden movement of the first body 101 and the second body 102 due to an external force may be prevented or reduced, thereby having an advantage of protecting parts that move the first body 101 and the second body 102 away from or closer to each other.

The link modules 200, 300 include a path portion 300 disposed on the first body 101 and a link portion 200 disposed on the second body 102.

Specifically, the path portion 300 is disposed to be open on an inner surface 1015 of the first body 101. The path portion 300 may be elongated along a direction in which the first body 101 and the second body 102 move away from or closer to each other on the inner surface 1015 of the first body 101.

On the other hand, at least part of the first body 101 may have a double structure so as not to be visually recognized from an outside of the first body 101 even when the path portion 300 is open. Specifically, the first body 101 may be configured with an inner body 101a constituting an inner surface 1015 of the first body 101 and an outermost body 101b disposed at an outermost side thereof. In this case, the inner body 101a may be fitted between a second link rivet 244 and a link front cover 220 by the link portion 200.

The link portion 200 may be disposed on the second body 102. Specifically, the link portion 200 may be mounted on the third rear surface portion 1022 of the second body 102. At least part of the link portion 200 is moved by being fitted in the path portion 300. That is, the path portion 300 may serve as a guide through which the link portion 200 is moved.

Specifically, referring to (b) of FIG. 6, the link portion 200 includes a first link rivet 242 allowing the link portion 200 to be coupled to the second body 102, and a second link rivet 244 allowing part of the link portion 200 to be fitted in the outermost body 101b of the first body 101. As part of the second link rivet 244 is coupled to the outermost body 101b, the link portion 200 may be moved by being fitted in the path portion 300.

In the flexible display device 100 according to an embodiment of the present disclosure, the first state and the second state may be easily moved by the link modules 200, 300 including the link portion 200 and the path portion 300. Furthermore, in the second state, the link modules 200, 300 may fix the first body 101 and the second body 102 to each other, thereby having an advantage capable of more firmly using the flexible display device 100 depending on the use state and an advantage capable of reducing damage to the internal parts of the flexible display device 100 by an external force due to a drop or the like.

FIG. 7 is an exploded perspective view showing a shape in which the link portion 200 according to an embodiment of the present disclosure is disassembled. FIG. 8 is a plan view of the link portion 200 of FIG. 7 and a view showing a perspective view of the link front cover 220.

The link portion 200 according to an embodiment of the present disclosure includes a link rear cover 210, a link front cover 220, and a link spring 230.

The link rear cover 210 is coupled to one side of the second body 102. The link rear cover 210 is inserted into and fixed to a hole 1022a of the second body 102 by the first link rivet 242.

The link rear cover 210 may include a spring hook portion 211 protruding from one side to engage with the link spring 230. Part of the coil portion 232 of the link spring 230 may be caught in the spring hook portion 211 to fix the link spring 230 to the link rear cover 210. Furthermore, the spring hook portion 211 may support the link spring 230 such that the link spring 230 can press the link front cover 220.

Meanwhile, the link rear cover 210 may include a first engaging portion 212 protruding toward the link front cover 220. The first engaging portion 212 may limit the movement of the first protrusion 222 such that the first protrusion 222 of the link front cover 220, which will be described later, does not easily move therebeyond. However, when the first protrusion 222 presses the first engaging portion 212 with a large force, the first protrusion 222 may rotate beyond the first engaging portion 212. At this time, a locking state and an unlocking state of the link modules 200, 300 may be determined according to a state in which the first protrusion 222 and the first engaging portion 212 are positioned with respect to each other. This will be described later in detail.

The link rear cover 210 may further include a rotation guide 214 that protrudes toward the link front cover 220 along a circumference of the link rear cover 210, and guides the link front cover 220 to rotate.

Furthermore, the link rear cover 210 may include a second engaging portion 215 bent at both end portions of the rotation guide 214 to protrude from the rotation guide 214, and caught in at least part of the link front cover 220 to limit the rotation of the link front cover 220.

Specifically, the first engaging portion 212 may limit the rotation of the first protrusion 222 of the link front cover 220. In addition, the second engaging portion 215 may limit the rotation of the second protrusion of the link front cover 220. Referring to (b) of FIG. 8, the second engaging portion 215 may restrict the link front cover 220 from rotating in a clockwise direction (direction r). Furthermore, the first engaging portion 212 may suggest that the link front cover 220 rotates in a counterclockwise direction (an opposite direction to the direction r).

Accordingly, the first engaging portion 212 and the second engaging portion 215 of the link rear cover 210 may be caught in the first protrusion 222 and the second protrusion of the link front cover 220, thereby restricting a rotating area of the link front cover 220.

The link front cover 220 may be disposed to be relatively rotatable with respect to the link rear cover 210. Furthermore, the link front cover 220 is coupled to the link rear cover 210.

The link front cover 220 may include a first protrusion 222 protruding to limit the rotation of the link rear cover 210 as being caught in the first engaging portion 212. That is, the first protrusion 222 may be caught in the first engaging portion 212 as the link front cover 220 is rotated. Specifically, referring to (a) and (b) of FIG. 8, the first protrusion 222 may be caught in the first engaging portion 212 as the link front cover 220 rotates in a direction opposite to the clockwise direction (direction r).

At least part of the link front cover 220 may be defined in a partial circumferential shape similar to the foregoing link rear cover 210. In addition, a first link rivet groove 223a into which the first link rivet 242 is inserted and a second link rivet groove 223b into which the second link rivet 244 is inserted may be disposed in the link front cover 220.

A rotation protrusion portion 224 protruding outward to correspond to the rotation guide 214 may be disposed on a circumferential portion of the link front cover 220. When the link front cover 220 rotates in response to the rotation guide 214, the rotation protrusion portion 224 may guide the link front cover 220 so as not to deviate from the rotation guide 214 of the link rear cover 210.

Meanwhile, the link front cover 220 may include a second protrusion that protrudes from one end of the rotation protrusion portion 224, and is caught in the second engaging portion 215 when the link front cover 220 is over-rotated. Referring to FIG. 8, the second protrusion may be caught in the second engaging portion 215 when the link front cover 220 is rotated in a clockwise direction beyond a predetermined range.

The link front cover 220 may further include an extension portion 221 extending in any one direction. The extension portion 221 may include a spring engaging portion 228 protruding from one surface such that the coil protruding portion 234 of the link spring 230, which will be described later, is caught therein. The coil protruding portion 234 may be caught in the spring engaging portion 228 to press the link front cover 220 such that the link front cover 220 rotates in a clockwise direction.

The link spring 230 may be interposed between the link rear cover 210 and the link front cover 220. The link spring 230 may press the link front cover 220 such that the link front cover 220 rotates in one direction. Specifically, the link spring 230 may include a coil portion 232 wound in a plurality and caught in the spring hook portion 211, and a coil protruding portion 234 protruding from the coil portion 232 toward the extension portion 221.

The link spring 230 and the coil protruding portion 234 may press one side of the extension portion 221 to rotate the link front cover 220. As described above, the extension portion 221 and/or the spring engaging portion 228 may be pressed. That is, the link spring 230 may be caught in the spring engaging portion 228 to apply a force in a direction of rotating the link front cover 220. Accordingly, as illustrated in (b) of FIG. 8, the link front cover 220 may be rotated in a clockwise direction.

On the other hand, the link portion 200 may further include a first link rivet 242 inserted into the center of the link front cover 220 and the center of the link rear cover 210, and inserted into the second body 102, and a second link rivet 244 inserted into the extension portion 221 of the link rear cover 210, and caught in the path portion 300 to move along a surface constituting the path portion 300.

The first link rivet 242 may couple the link rear cover 210 to the second body 102. The first link rivet 242 may couple the link front cover 220 to the link rear cover 210. Meanwhile, the first link rivet 242 may fix the link front cover 220 such that the link front cover 220 is relatively rotatable with respect to the link rear cover 210.

The second link rivet 244 is coupled to the extension portion 221 of the link front cover 220.

Specifically, referring to FIG. 7, the second link rivet 244 may include a head 244a, a first portion 244b fitted in the path portion 300 of the first body 101, and a second portion 244c inserted into the extension portion 221 of the link front cover 220. As described above, the first portion 244b may be moved in contact with the outermost body of the path portion 300. Furthermore, when the second portion 244c is inserted into the extension portion 221 of the link front cover 220 to rotate the link front cover 220, the second portion 244c is moved together with the link front cover 220.

A rotating range of the link front cover 220 may be restricted by the first engaging portion 212 and the second engaging portion 215 disposed in the link rear cover 210, and the first protrusion 222 and the second protrusion disposed in the link front cover 220. Accordingly, there is an effect of preventing or reducing the link portion 200 from being over-rotated.

FIG. 9 is a conceptual view showing a shape in which the link portion 200 moves along a path portion 300 from a first state to a second state. FIG. 10 is a conceptual view showing a shape in which the link portion 200 moves along the path portion 300 from a released state to a second state. FIG. 11 is a conceptual view showing a shape in which the first body 101 and the second body 102 are switched from a first state to a second state, and vice versa. For convenience of explanation, only the path portion 300 and the link portion 200 are illustrated, and the first body 101 is a place where the path portion 300 is disposed, and the link portion 200 is coupled to the second body 102.

(a) of FIG. 9 and (a) of FIG. 11 are shapes in which the first body 101 and the second body 102 are disposed in a first state. (b) of FIG. 11 is a shape in a stroke state during a process in which the first body 101 and the second body 102 are changed from a first state to a second state. (b) and (c) of FIG. 9 and (c) of FIG. 11 are shapes in which the first body 101 and the second body 102 are disposed in a second state. (a) of FIG. 10 and (d) of FIG. 11 are shapes in which the first body 101 and the second body 102 are disposed in a released state. (b) of FIG. 10 and (e) of FIG. 11 are shapes in which the first body 101 and the second body 102 are disposed in a stroke state. (c) of FIG. 10 and (f) of FIG. 11 are shapes in which the first body 101 and the second body 102 are returned again to the first state. Hereinafter, a description will be given with reference to FIGS. 9 to 11.

First, referring to (a) of FIG. 9, a path groove 305 that is open in a width direction of the first body 101 is disposed in the path portion 300. The path portion 300 may include a first surface 310 constituting a lower surface of the path groove 305, a second surface 320 connected from a first groove 301 to a second groove 302 and inclined so as to allow the link front cover 220 to rotate upward, a third surface 330 constituting an upper surface of the path groove 305, and a fourth surface 340 inclined so as to allow the link front cover 220 to rotate downward.

Unlike the drawing, a distance between the first surface 310 and the third surface 330 of the path groove 305 may be smaller than a size of the head 244a of the second link rivet 244. Accordingly, the link portion 200 may move in the path portion 300, thereby preventing or reducing the link portion 200 from being deviated from the path portion 300.

Furthermore, the inclinations of the second surface 320 and the third surface 330 may constitute an inclination to go down when the second body 102 moves in a direction closer to the first body 101. Specifically, an inclination may be defined in a downward direction while going to the right with reference to FIG. 9.

Meanwhile, the first groove 301 to the third groove 303 may be disposed in the path portion 300.

The first groove 301 is a groove into which the second link rivet 244 is inserted in the first state to limit the rotation of the link front cover 220. Specifically, as shown in (a) of FIG. 9, the second link rivet 244 may inserted thereinto, and the extension portion 221 and the link front cover 220 surrounding the first groove 301 may be restricted from being rotated upward or downward by a fifth side surface 351, a sixth side surface 352, and the first surface 310.

The second groove 302 is disposed such that the link front cover 220 is rotatably recessed downward in one direction in the second state. The second groove 302 may be surrounded by a first side surface 311, a second side surface 312, and the second surface 320.

Specifically, the first body 101 and the second body 102 may be moved from (a) of FIG. 9 in the first state to (b) of FIG. 9 in the second state. At this time, the foregoing link spring 230 presses the extension portion 221 in a clockwise direction, and accordingly, the extension portion 221 rotates toward the second groove 302. Accordingly, as shown in (c) of FIG. 9, the second link rivet 244 may be inserted into the second groove 302.

In the second state in which the second link rivet 244 is inserted into the second groove 302, the first body 101 and the second body 102 do not move in a direction (b) of moving away from each other or in a direction (a) of moving closer to each other. That is, the first body 101 and the second body 102 may be placed in a state constrained to each other by the link portion 200. In this second state of the user, the flexible display device 100 may be used.

In addition, as the second link rivet 244 is inserted into the second groove 302, and the extension portion 221 is pressed downward by the link spring 230 in the second state, the first body 101 and the second body 102 may be prevented or reduced from being relatively rotated in directions misaligned from each other. Specifically, the first body 101 and the second body 101 do not move away from each other by the second link rivet 244 inserted into the second groove 302 2 when an overlapping portion between the first body 101 and the second body 102 receives an upward force, and the second link rivet 244 may not be released from the second groove 302 as the second link rivet 244 is continuously pressed downward by the link spring 230. Accordingly, an external force applied to the first body 101 and the second body 102 in directions misaligned from each other may be reduced.

Moreover, the first body 101 and the second body 102 may not move away from or close to each other due to a relatively small external force, thereby increasing convenience in use. In addition, even when the second body 102 is received an impact by an external force, the impact is concentrated on the link portion 200 and the second groove 302, thereby having an advantage of protecting the internal components of the flexible display device 100.

The third groove 303 may be configured to be recessed such that the second link rivet 244 is inserted thereinto, and the first body 101 and the second body 102 move away from each other. Specifically, the third groove 303 may be surrounded by a third side surface 321, a fourth side surface 322, and the third surface 330.

The link portion 200 may be disposed to rotate as the first body 101 and the second body 102 move from a second state to a released state such that the first body 101 and the second body 102 can be changed to a stroke state. That is, the first body 101 and the second body 102 are configured to implement a released state in which the first body 101 and the second body 102 are disposed further apart than the second state. Furthermore, the link modules 200, 300 are configured such that the first body 101 and the second body 102 can be switched back to the stroke state from the released state.

Specifically, (a) of FIG. 10 is a released state. When a pressure above a predetermined level is applied by an external force or motor driving in a direction of moving the second body 102 away from the first body 101 in a second state in which the second link rivet 244 is inserted into the second groove 302 as shown in (c) of FIG. 9, the second link rivet 244 moves along the second surface 320, and accordingly, the extension portion 221 of the link front cover 220 is rotated. Furthermore, the second body 102 is further away from the first body 101.

At the same time, the first engaging portion 212 protruding from the link front cover 220 may move beyond the first protrusion 222 of the link rear cover 210. That is, in the first state and the second state, the link front cover 220 is in an unlocking state that can be rotated in a downward direction by the link spring 230.

However, as the extension portion 221 moves along the second surface 320, the link front cover 220 is rotated, and accordingly, the first engaging portion 212 of the link front cover 220 moves beyond the first protrusion 222. At this time, the link front cover 220 is continuously pressed in a clockwise direction by the link spring 230, but the first engaging portion 212 is caught in the first protrusion 222, and the link front cover 220 is restricted from being rotated in one direction by a pressure due to the link spring 230. This may be referred to as a locking state of the link portion 200. As the link portion 200 moves from the second groove 302 to the third groove 303, it may change from an unlocking state to a locking state.

Referring to (b) of FIG. 10, it is a stroke state in which the link portion 200 in the locking state moves from the second state (or released state) to the first state. At this time, the second link rivet 244 may be moved while in contact with the third surface 330. Specifically, although the extension portion 221 receives a downward rotating force by the link spring 230, the rotation of the extension portion 221 is restricted by the first engaging portion 212 and the first protrusion 222, and thus the second link rivet 244 is moved in contact with the third surface 330.

That is, the link portion 200 is configured to move to the unlocking state in the process of changing from the first state to the second state, and change to the locking state due to the first engaging portion 212 being caught in the first protrusion 222 in the process of changing from the second state to the released state. Furthermore, it may be moved to the locking state in the stroke state moving from the released state (the second state) to the first state.

Referring to (c) of FIG. 10, the second link rivet 244 may rotate downward again by the fourth surface 340. That is, in the link portion 200 that has been in the locking state by the first engaging portion 212 and the first protrusion 222, as the second link rivet 244 moves along the fourth surface 340 due to an external force of allowing the second body 101 and the second body 102 to move closer to each other, the first protrusion 222 may move to the right side of the first engaging portion 212 again. Accordingly, the link portion 200 in the locking state may change to the unlocking state.

According to the flexible display device 100 in accordance with an embodiment of the present disclosure, unintentional switching between a first state and a second state by a higher external force generated from a section moving from the second state to a released state and a higher external force generated from a section in which the link portion 200 moves from a locking state to an unlocking state again may be prevented or reduced. In addition, there is an advantage capable of allowing a user to sensibly recognize switching to the first state and the second state by an external force required when switching to the first state and the second state.

The configurations and methods according to the above-described embodiments will not be applicable in a limited way to the foregoing flexible display device, and all or part of each embodiment may be selectively combined and configured to make various modifications thereto.

The invention claimed is:
1. A flexible display device comprising:
a first body;
a second body configured to be movable relative to the first body;
a flexible display disposed to be exposed to a front surface of the first body and a rear surface of the second body; and
a link module that guides the first body and the second body to move relative to each other,
wherein the link module fixes the first body and the second body to each other to prevent or reduce the first body and the second body from moving closer to or away from each other when the first body and the second body are spaced apart by a preset distance,
wherein the first body and the second body are configured to implement:
a first state in which an area of the flexible display exposed through a rear surface portion of the second body is the largest when the first body and the second body are positioned adjacent to each other;
a second state in which an area of the flexible display exposed through a front surface portion of the first body is the largest when the first body and the second body are positioned away from each other; and
a stroke state in which the first state and the second state are switched from each other, respectively,
wherein the link module fixes the first body and the second body to each other to prevent or reduce the first body and the second body from being switched to the stroke state from the second state,
wherein the first body and the second body are configured to implement a released state in which the first body and the second body are disposed further apart than the second state, and
wherein the link module is configured to switch the first body and the second body back to the stroke state from the released state.

2. The flexible display device of claim 1, wherein the link module comprises:
a path portion disposed to be open on part of the first body; and
a link portion disposed on the second body to be moved by being fitted in the path portion, and
wherein the link portion is disposed to rotate as the first body and the second body move from the second state to the released state so as to change the first body and the second body to the stroke state.

3. The flexible display device of claim 2, wherein the link portion comprises:
a link rear cover coupled to one side surface of the second body;
a link front cover disposed to be relatively rotatable with respect to the link rear cover and coupled to the link rear cover; and
a link spring interposed between the link rear cover and the link front cover to press the link front cover so as to rotate the link front cover in one direction,
wherein the link front cover further comprises an extension portion extending in any one direction, and
wherein the link spring presses one side of the extension portion to rotate the link front cover.

4. The flexible display device of claim 3, wherein the link rear cover comprises a spring hook portion protruding from one side to engage with the link spring,
wherein the link spring comprises:
a coil portion wound in a plurality and caught in the spring hook portion; and a coil protruding portion protruding from the coil portion toward the extension portion,
wherein the extension portion comprises a spring engaging portion protruding from one surface to engage with the coil protruding portion, and
wherein the link spring is caught in the spring engaging portion to apply a force in a direction of rotating the link front cover.

5. The flexible display device of claim 4, wherein at least part of the link front cover and the link rear cover is defined in a partial circumferential shape,
wherein the link rear cover comprises a first engaging portion protruding toward the link front cover, and
wherein the link front cover comprises a first protrusion protruding to limit rotation as being caught in the first engaging portion.

6. The flexible display device of claim 5, wherein the link rear cover comprises:
a rotation guide protruding toward the link front cover along a circumference of the link rear cover to guide the rotation of the link front cover; and
a second engaging portion bent at both end portions of the rotation guide to protrude from the rotation guide, and caught in the link front cover to limit the rotation of the link front cover.

7. The flexible display device of claim 6, wherein the link front cover comprises:

a rotation protrusion portion protruding outward to correspond to the rotation guide; and a second protrusion protruding from one end of the rotation protrusion portion to be caught in the second engaging portion when the link front cover is over-rotated.

8. The flexible display device of claim 7, wherein the link portion further comprises:

a first link rivet inserted into the center of the link rear cover and the center of the link front cover, and inserted into the second body; and a second link rivet inserted into an extension portion of the link rear cover, and caught in the path portion to move along a surface constituting the path portion.

9. The flexible display device of claim 8, wherein the path portion comprises:

a path groove that is open in a width direction of the first body, and wherein the path groove comprises:

a first groove into which the second link rivet is inserted to limit the rotation of the link front cover in the first state;

a second groove in which the link front cover is rotatably recessed downward in one direction in the second state; and a third groove configured to be recessed such that the second link rivet is inserted thereinto, and the first body and the second body move away from each other in the released state.

10. The flexible display device of claim 9, wherein the path portion comprises:

a first surface constituting a lower surface of the path groove;

a second surface connected from the first groove to the second groove and inclined so as to allow the link front cover to rotate upward;

a third surface constituting an upper surface of the path groove; and a fourth surface inclined so as to allow the link front cover to rotate downward.

11. The flexible display device of claim 10, wherein the link portion is configured such that the second link rivet moves along the second surface to rotate the link front cover as the second link rivet is inserted into the second groove and then the second body and the first body are pressed in directions of moving away from each other.

12. The flexible display device of claim 11, wherein the link portion is configured to implement either one of:

a locking state in which the first engaging portion is caught in the first protrusion to restrict the rotation of the link front cover in one direction due to a pressure by the link spring; and an unlocking state in which the link front cover is placed in a state capable of rotating in the one direction, wherein the link portion moves to the unlocking state in the process of changing from the first state to the second state, and wherein the link portion is configured to change to the locking state due to the first engaging portion being caught in the first protrusion in the process of changing from the second state to the released state.

13. The flexible display device of claim 12, wherein the link portion is configured to maintain a locking state in the stroke state of moving toward the first state from the released state, and change from the locking state to the unlocking state due to the rotation of the link front cover as moving along the fourth surface.

* * * * *